O. FRITSCHE.
SPRING.
APPLICATION FILED MAY 16, 1913.
1,070,796.
Patented Aug. 19, 1913.
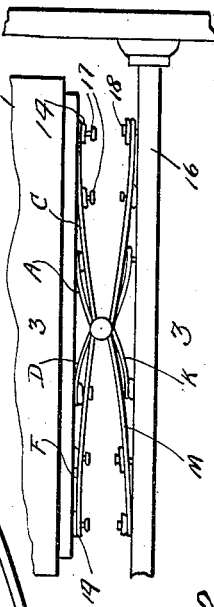
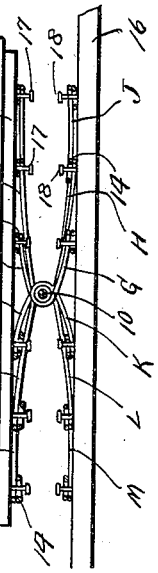
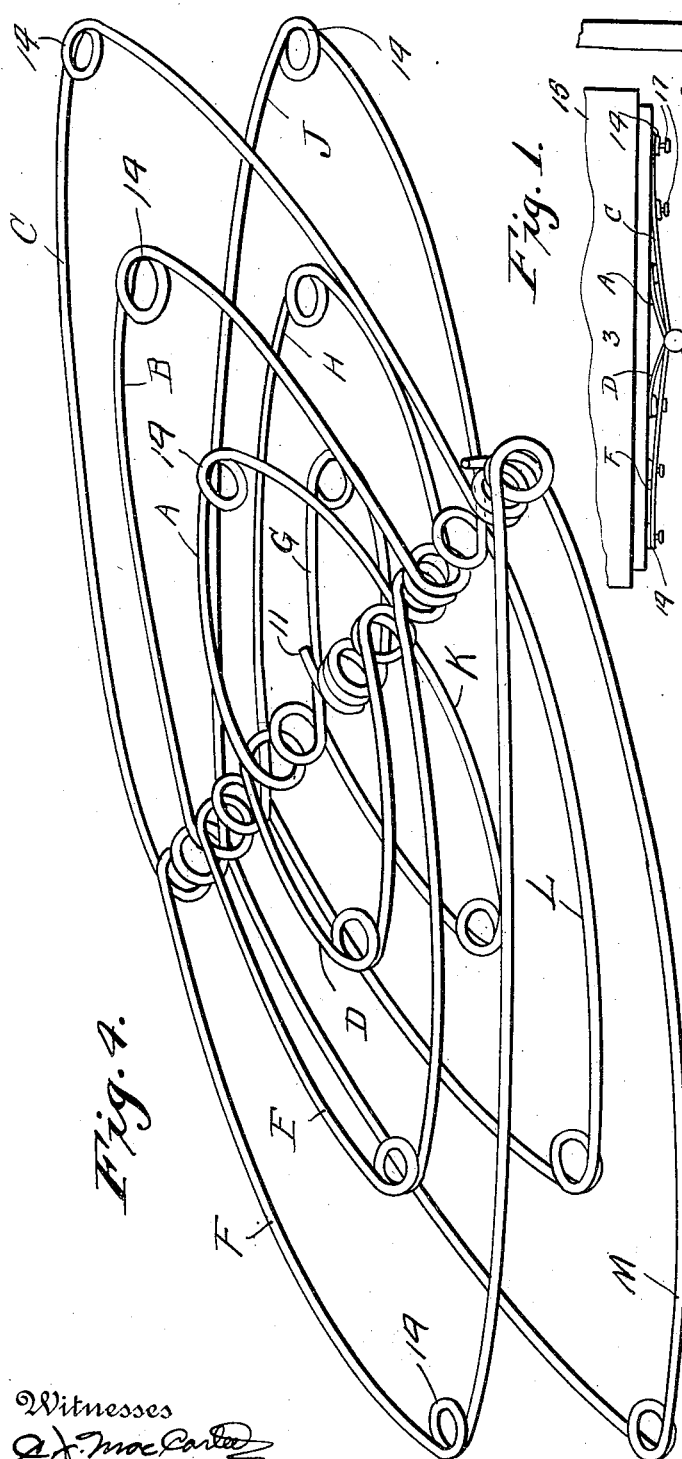
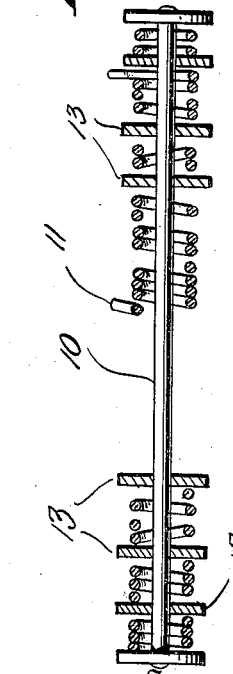
Witnesses
Inventor
O. Fritsche
By Chandler & Chandler
Attorneys

UNITED STATES PATENT OFFICE.

OTTO FRITSCHE, OF NEW ULM, MINNESOTA.

SPRING.

1,070,796.  Specification of Letters Patent.  Patented Aug. 19, 1913.

Application filed May 16, 1913. Serial No. 768,111.

*To all whom it may concern:*

Be it known that I, OTTO FRITSCHE, a citizen of the United States, residing at New Ulm, in the county of Brown, State of Minnesota, have invented certain new and useful Improvements in Springs; and I do hereby declare the following to be a full, clear, and exact description of the invention, such as will enable others skilled in the art to which it appertains to make and use the same.

This invention relates to springs and particularly to a type adapted for use in connection with vehicles such as carriages, wagons, railway cars, automobiles, etc.

The object of the invention resides in the provision of a spring of the character named which will efficiently absorb shocks incident to the travel of a vehicle irrespective of whether such shocks act in a horizontal or vertical direction.

A further object of the invention resides in the provision of a spring which can be used with facility in the construction of a stretcher, bed or any other device where an exceedingly responsive spring is required.

With the above and other objects in view the invention consists in the details of construction and in the arrangement and combination of parts to be hereinafter more fully described and particularly pointed out in the appended claim.

In describing the invention in detail reference will be had to the accompanying drawings wherein like characters of reference denote corresponding parts in the several views, and in which—

Figure 1 is a rear elevation of a vehicle showing the improved spring applied; Fig. 2, a vertical section of what is shown in Fig. 1; Fig. 3, an enlarged section on the line 3—3 of Fig. 1, and Fig. 4, a detail perspective view of the spring with the pivot member removed.

Referring to the drawings the spring is shown as formed from a single length of resilient material and comprises upper right hand wings A, B and C; upper left hand wings D, E and F; lower right hand wings G, H and J; and lower left hand wings K, L and M. The spring is mounted upon a rod or bar 10 and is constructed by starting at the point 11 and coiling the length of material about the rod 10 after which the material is carried laterally and the wing G formed. After the formation of this wing G the length of material is again coiled about the bar 10 and carried laterally to the left and the wing K formed. In a similar manner the wings D, A, E, B, H, L, J, M, F, and C are successively produced. The various coils in the formation of the wing of the spring are separated by washers 13 mounted on the bar 10, while in forming the various wings of the spring the free ends thereof are provided respectively with looped portions 14.

In applying the spring to a vehicle same is interposed between the body 15 of the vehicle and the axle 16. Mounted in the under side of the body 10 is a plurality of studs 17 corresponding in number to the number of upper wings of the spring, while a plurality of studs 18 are mounted in the upper side of the axle 10 and correspond in number to the number of lower wings of the spring. The studs 17 are positioned through the loops 14 of the upper wings of the spring while the studs 18 pass respectively through the loops 14 of the lower wings of the spring. In this manner the spring is associated with the vehicle to efficiently absorb jar and vibration incident to travel.

What I claim is:

A spring comprising a central bar, and a plurality of upper and lower right and left hand wings formed from a single length of resilient material coiled successively around the bar after the formation of each wing and looped at the free end of each wing.

In testimony whereof, I affix my signature, in the presence of two witnesses.

OTTO FRITSCHE.

Witnesses:
 JOHN FREDERICK,
 OSCAR MARTI.

Copies of this patent may be obtained for five cents each, by addressing the "Commissioner of Patents, Washington, D. C."